(12) United States Patent
Stevens et al.

(10) Patent No.: US 8,113,542 B1
(45) Date of Patent: Feb. 14, 2012

(54) PRESSURIZED GAS RELEASE MECHANISM

(75) Inventors: Bruce A. Stevens, Oakland, MI (US); Robert M. Krupp, Rochester, MI (US)

(73) Assignee: TK Holdings, Inc., Armada, MI (US)

(*) Notice: Subject to any disclaimer, the term of this patent is extended or adjusted under 35 U.S.C. 154(b) by 179 days.

(21) Appl. No.: 12/321,537

(22) Filed: Jan. 22, 2009

Related U.S. Application Data

(60) Provisional application No. 61/063,034, filed on Jan. 31, 2008, provisional application No. 61/062,460, filed on Jan. 25, 2008, provisional application No. 61/011,961, filed on Jan. 22, 2008.

(51) Int. Cl.
*B60R 21/26* (2006.01)

(52) U.S. Cl. ............................................ 280/737

(58) Field of Classification Search .............. 280/736, 280/737, 741; 222/3, 5; 137/67, 68.13; 102/530, 102/531
See application file for complete search history.

(56) References Cited

U.S. PATENT DOCUMENTS

| | | | |
|---|---|---|---|
| 3,749,419 A * | 7/1973 | Usui et al. ................... 280/737 |
| 3,810,655 A | 5/1974 | Prachar ....................... 280/150 |
| 3,856,180 A * | 12/1974 | Merrell ........................... 222/5 |
| 3,856,181 A * | 12/1974 | Merrell ........................... 222/5 |
| 3,865,273 A * | 2/1975 | Zeigler ........................... 222/5 |
| 3,868,124 A * | 2/1975 | Johnson ...................... 280/737 |
| 3,869,143 A * | 3/1975 | Merrell ....................... 280/737 |
| 4,494,963 A | 1/1985 | Reich ............................. 48/69 |
| 5,226,668 A * | 7/1993 | Delonge-Immik et al. ... 280/737 |
| 5,350,192 A * | 9/1994 | Blumenthal ................. 280/737 |
| 5,487,561 A | 1/1996 | Mandzy et al. ............. 280/741 |
| 5,649,720 A | 7/1997 | Rink et al. ................... 280/737 |
| 5,690,357 A * | 11/1997 | Cuevas ........................ 280/737 |
| 5,709,406 A * | 1/1998 | Buchanan .................... 280/737 |
| 5,803,494 A * | 9/1998 | Headley ....................... 280/741 |
| 5,806,886 A | 9/1998 | Ittel et al. .................... 280/741 |
| 6,051,158 A | 4/2000 | Taylor et al. ................... 252/67 |
| 6,076,468 A | 6/2000 | DiGiacomo et al. ......... 102/530 |
| 6,196,583 B1 | 3/2001 | Ruckdeschel et al. ....... 280/736 |
| 6,231,702 B1 | 5/2001 | Blomquist .................... 149/36 |
| 6,247,725 B1 * | 6/2001 | Moller ......................... 280/737 |
| 6,932,383 B2 | 8/2005 | Flamm ........................ 280/737 |
| 7,073,820 B2 | 7/2006 | McCormick ................. 280/741 |
| 7,134,690 B2 | 11/2006 | Furusawa et al. ............. 280/736 |
| 7,178,831 B2 | 2/2007 | Yoshida et al. .............. 280/741 |
| 7,401,808 B2 * | 7/2008 | Rossbach et al. ............. 280/737 |
| 7,588,265 B2 | 9/2009 | Blackburn ................... 280/737 |
| 7,597,354 B2 | 10/2009 | Blackburn ................... 280/737 |
| 2002/0074036 A1 * | 6/2002 | Specht et al. ............. 137/68.13 |
| 2002/0130502 A1 * | 9/2002 | Jonsson et al. ............... 280/737 |
| 2007/0138775 A1 * | 6/2007 | Rossbach et al. ............. 280/736 |
| 2007/0138776 A1 * | 6/2007 | Rossbach et al. ............. 280/737 |
| 2008/0284148 A1 * | 11/2008 | Bjorklund et al. ............ 280/737 |

OTHER PUBLICATIONS

Office Action U.S. Appl. No. 12/217,616, filed Jul. 7, 2008, Dated Sep. 29, 2009 (185).

* cited by examiner

*Primary Examiner* — Paul N Dickson
*Assistant Examiner* — Robert A Coker
(74) *Attorney, Agent, or Firm* — L.C. Begin & Associates, PLLC.

(57) ABSTRACT

A gas seal for containing a pressurized fluid in a container. The gas seal includes a rupturable portion and an extension coupled to the rupturable portion such that a predetermined minimum force acting on the extension produces a rupture of the rupturable portion, permitting pressurized fluid flow past the gas seal. An inflator and a vehicle occupant protection system incorporating the gas seal are also disclosed.

25 Claims, 8 Drawing Sheets

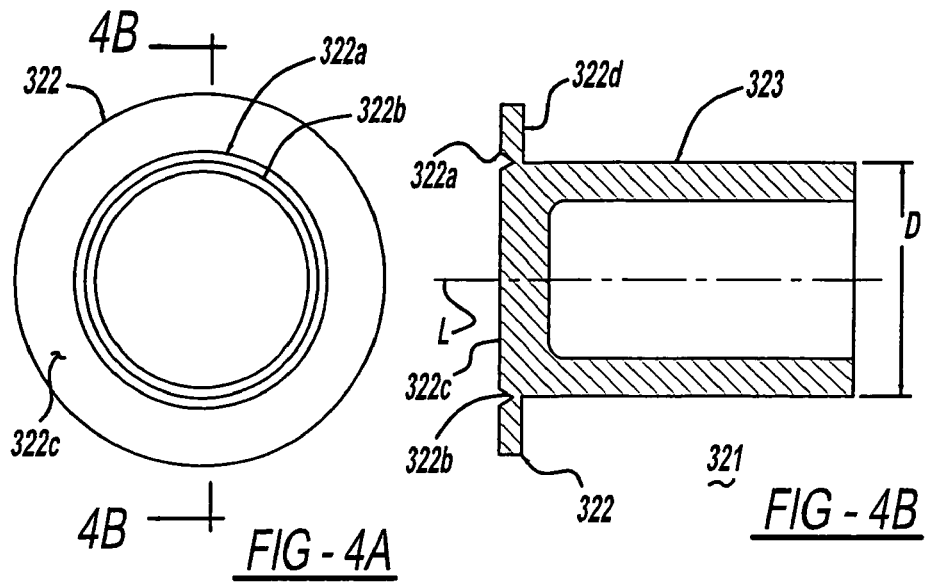
FIG - 4A
FIG - 4B
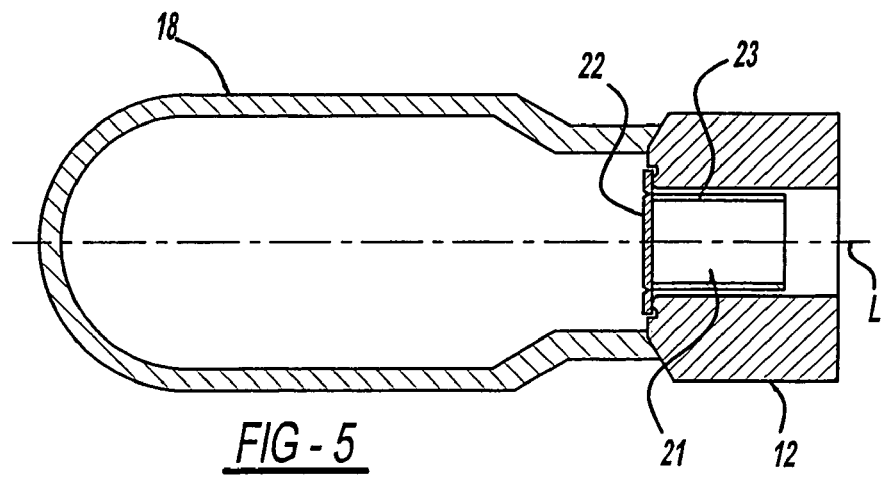
FIG - 5
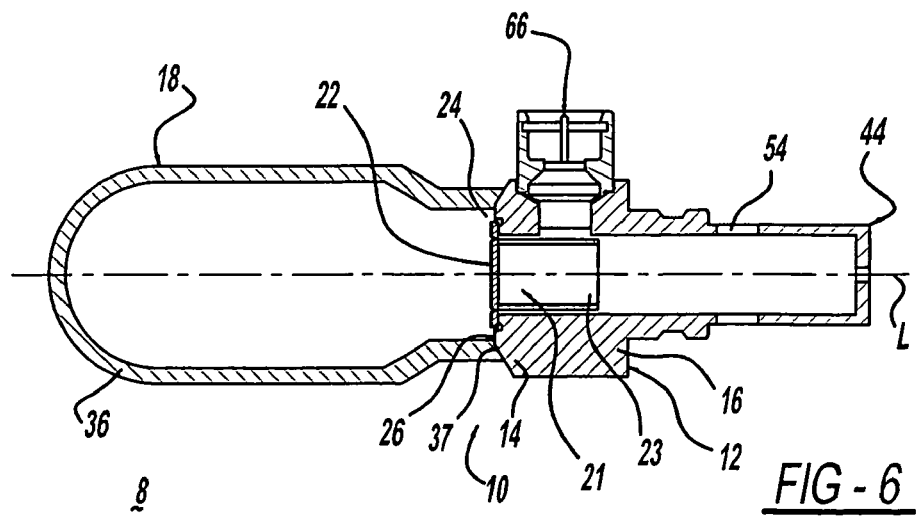
FIG - 6

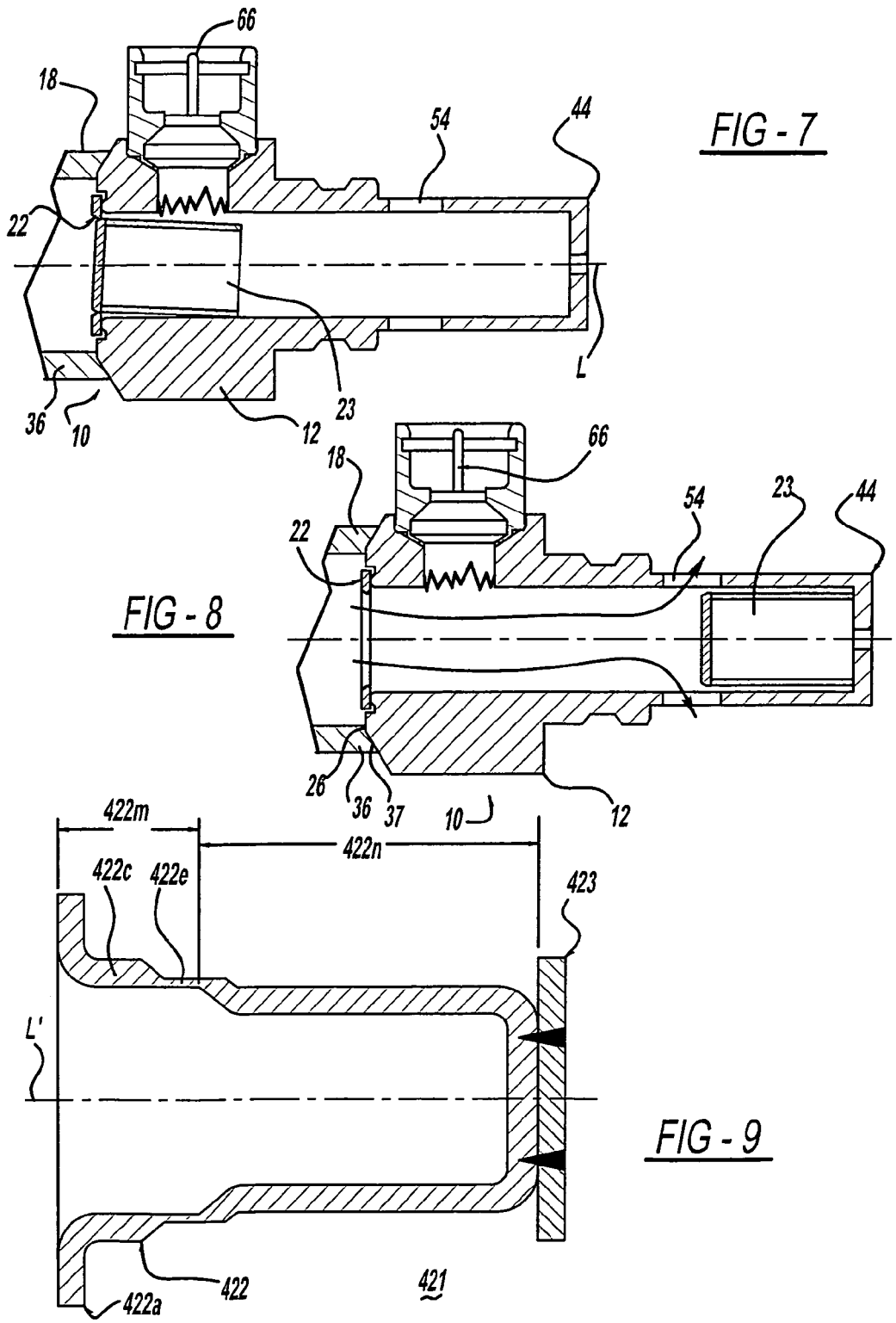

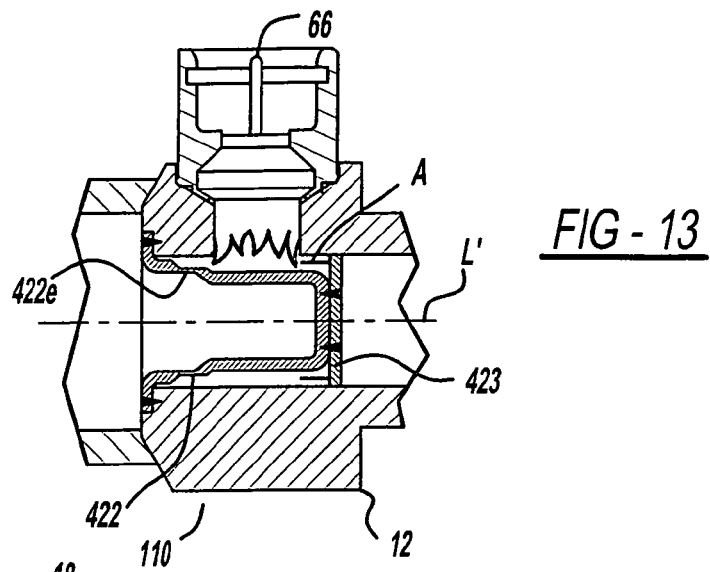
FIG - 13
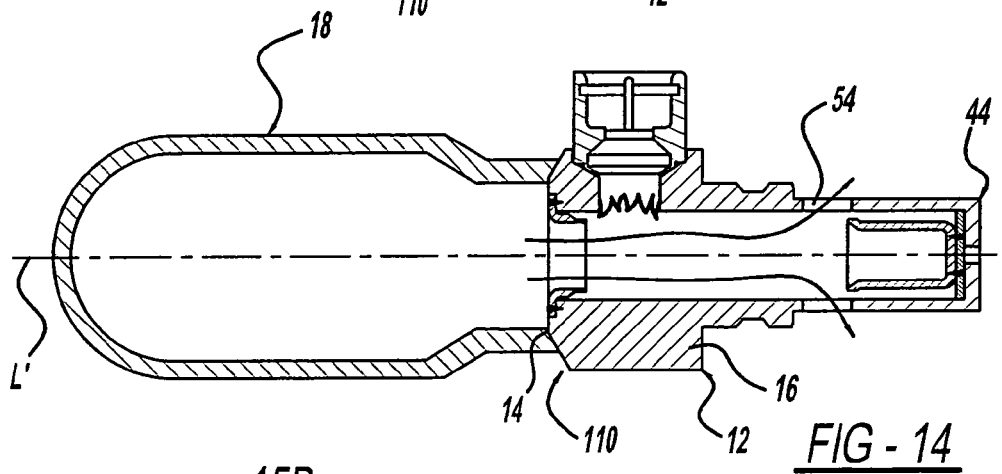
FIG - 14
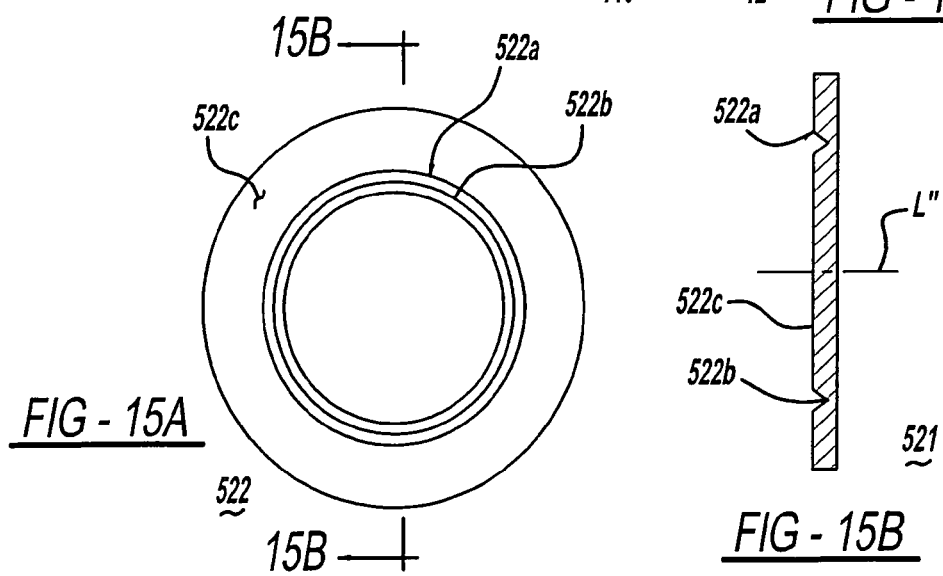
FIG - 15A
FIG - 15B

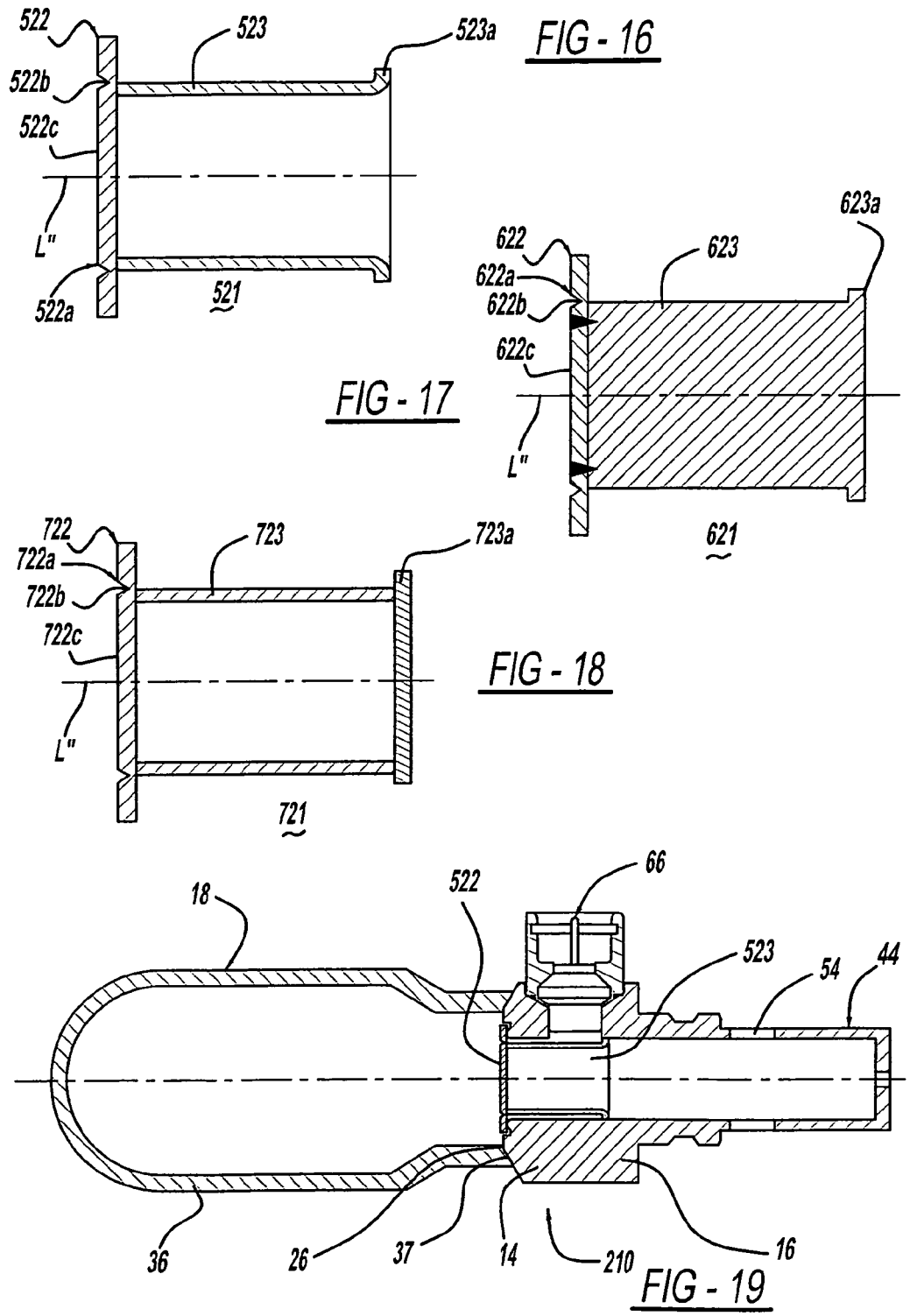

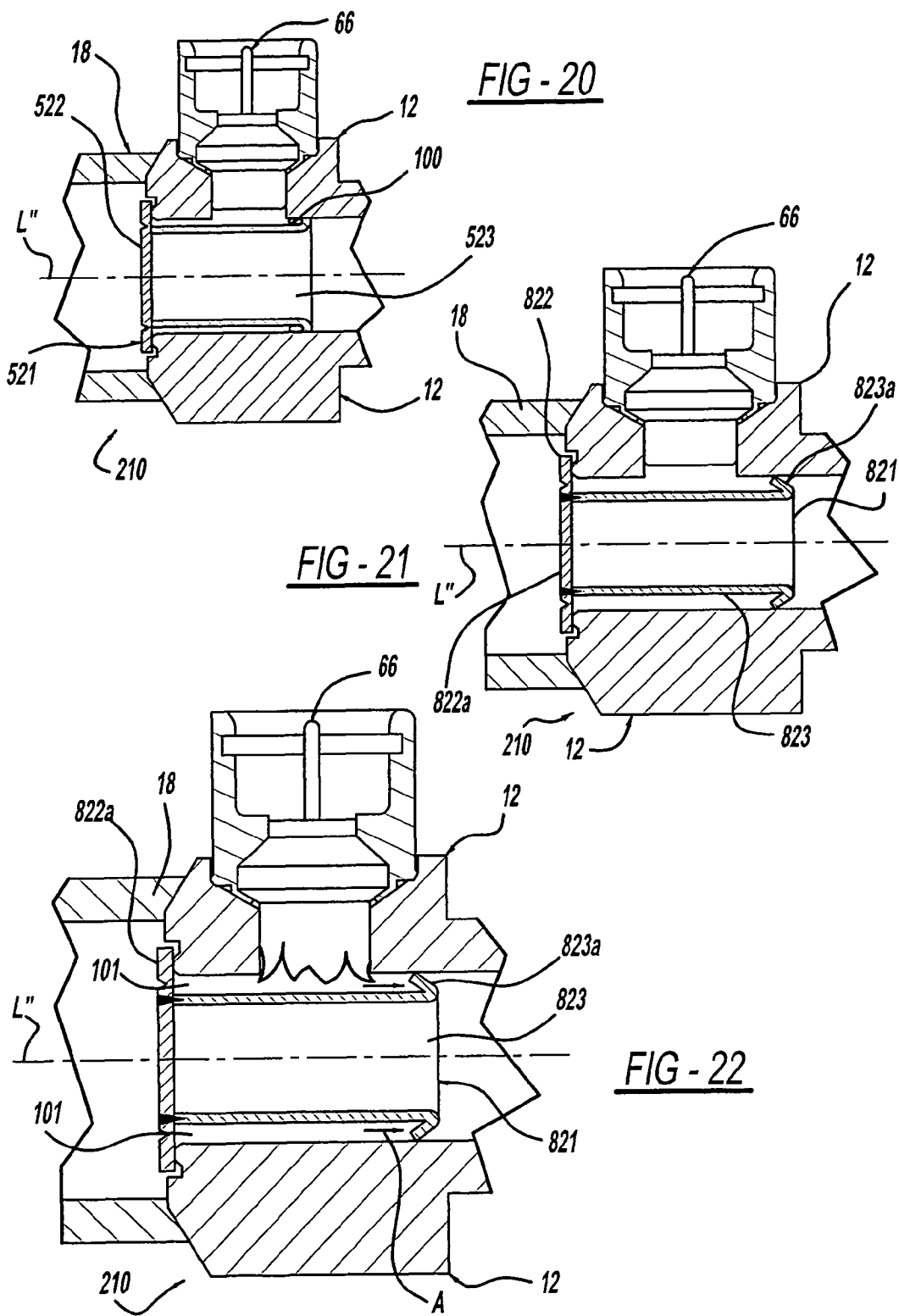

PRESSURIZED GAS RELEASE MECHANISM

CROSS-REFERENCE TO RELATED APPLICATION

This application is entitled to and claims the benefit of Provisional Patent Application Ser. Nos. 61/063,034 (filed on Jan. 31, 2008), 61/062,460 (filed on Jan. 25, 2008), and 61/011,961 (filed on Jan. 22, 2008).

BACKGROUND OF THE INVENTION

The present invention relates to devices used to activate gas-actuatable elements in a vehicle occupant protection system and, more particularly, to a mechanism for releasably containing a pressurized inflation fluid in a container used in a stored gas inflator or hybrid gas generating system.

Inflation systems for deploying inflatable devices such as air bags in motor vehicles generally employ an inflator or gas generating system in fluid communication with an uninflated air bag. The inflator is typically triggered by a firing circuit when a sensor determines that vehicle acceleration has exceeded a predetermined threshold value (for example, through the use of an acceleration-responsive inertial switch.)

Air bag inflation systems often utilize a stored gas generator (or hybrid gas generator) housed within the B-pillar of a car, for example. Stored gas generators contain pressurized gas that is released to inflate the airbag upon receipt of a predetermined signal from the sensor. An ongoing challenge is to reduce the time required to release the stored gas upon a crash event. Furthermore, improved safety and reduced manufacturing costs are also ongoing concerns. Improvements in any of these areas would provide an advantage over state-of-the-art gas release systems.

SUMMARY OF THE INVENTION

In one aspect, a gas seal is provided for containing a pressurized fluid in a container. The gas seal includes a rupturable portion and an extension coupled to the rupturable portion such that a predetermined minimum force acting on the extension produces a rupture of the rupturable portion, permitting pressurized fluid flow past the gas seal.

In another aspect, a gas seal is provided for containing a pressurized fluid in a container. The gas seal includes a rupturable portion having a stress riser formed therein, and an extension coupled to the rupturable portion proximate the stress riser such that a predetermined minimum force applied to the extension is transferred to the stress riser to produce a rupture of the rupturable portion.

In another aspect, a gas seal is provided for containing a pressurized fluid in a container. The gas seal includes a rupturable portion for forming a first seal to prevent flow of the pressurized fluid past the gas seal, and an extension coupled to the rupturable portion, the extension including a projection extending therefrom for forming a second seal between the extension and a housing in which the gas seal is mounted.

BRIEF DESCRIPTION OF THE DRAWINGS

In the drawings illustrating embodiments of the present invention:

FIG. 4A is an end view of a gas seal for sealing a gas-storage bottle in accordance with a fourth embodiment of the present invention.

FIG. 4B is a cross-sectional view of the gas seal shown in FIG. 4A.

FIG. 5 is a cross-sectional view of the gas seal shown in FIG. 1 incorporated into a housing attached to a gas bottle.

FIG. 6 is a cross-sectional view of the assembly shown in FIG. 5 including a diffuser coupled to the housing.

FIG. 7 is a partial cross-sectional view of the assembly shown in FIG. 6 during the first stage of breakage of the gas seal.

FIG. 8 is the partial cross-sectional view of FIG. 7 after breakage of the gas seal.

FIG. 9 is a cross-sectional view of a gas seal for sealing a gas-storage bottle in accordance with another embodiment of the present invention.

FIG. 13 is a partial cross-sectional view of the gas seal shown in FIG. 10 after activation of the igniter and immediately prior to breakage of the gas seal.

FIG. 14 is the cross-sectional view of FIG. 10 after breakage of the gas seal and detachment of a portion of the gas seal.

FIG. 15A is an end view of a portion of a gas seal for sealing a gas-storage bottle in accordance another embodiment of the present invention.

FIG. 15B is a cross-sectional view of the portion of the gas seal shown in FIG. 15A.

FIGS. 16-18 are cross-sectional views of gas seals for sealing a gas-storage bottle in accordance with other alternative embodiments of the present invention.

FIG. 19 is a cross-sectional view of the gas seal shown in FIG. 16 incorporated into a housing attached to a gas bottle.

FIG. 20 is a partial cross-sectional view of the gas seal shown FIG. 16 incorporating an additional sealing element.

FIG. 21 is a partial cross-sectional view of a gas seal for sealing a gas-storage bottle in accordance with another alternative embodiment of the present invention.

FIG. 22 is a partial cross-sectional view of the gas seal shown in FIG. 21 after activation of the igniter and immediately prior to breakage of the gas seal.

DETAILED DESCRIPTION

Figures 1A, 1B:
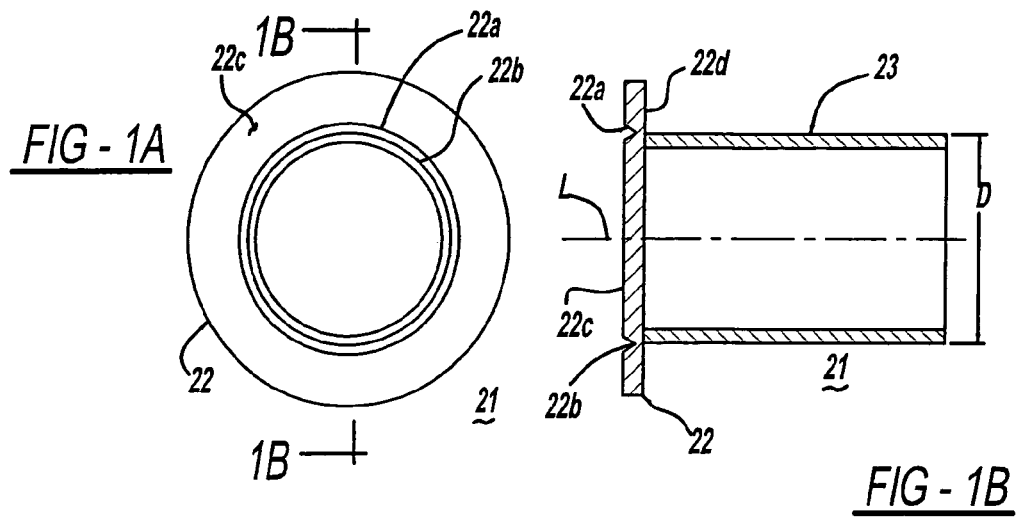
FIG. 1A is an end view of a gas seal for sealing a gas-storage bottle in accordance with a first embodiment of the present invention.
FIG. 1B is a cross-sectional view of the gas seal shown in FIG. 1A.

Similar reference characters denote similar features consistently throughout the attached drawings.

FIGS. 1-8 show various embodiments of a mechanism 10 for releasably containing pressurized fluid in a container, in accordance with the present invention. Referring in particular to FIGS. 6-8, mechanism 10 is shown secured to a gas bottle or tank 18 in which a pressurized fluid (in this case, an inflation gas) is stored. Bottle 18 has an annular wall 36 defining an opening 24, with an annular shoulder 37 formed in wall 36 and an annular ledge 26 extending along a base portion of shoulder 37.

Referring to FIGS. 1A, 1B, 5, and 6, in one embodiment, mechanism 10 includes a gas seal 21 comprising a rupturable portion 22 secured in fluid communication with an interior of bottle 18. Rupturable portion 22 forms a fluid-tight barrier preventing flow of pressurized gas through or around the member. Rupturable portion 22 may be seated along gas bottle annular ledge 26 and welded or otherwise secured thereon to obstruct flow of the pressurized fluid during normal vehicular operation. Alternatively, as shown in FIGS. 5 and 6, the rupturable portion may be seated along an edge of a housing 12 which is attached to an opening of bottle 18. Rupturable portion 22 also has at least one stress riser 22a coined, embossed, or otherwise formed along one or more sides thereof. Stress riser 22a defines a region along which the rupturable portion fractures to release the pressurized fluid from the bottle, when the rupturable portion is stressed as described below.

In the embodiments shown in FIGS. 1A-4B, the stress riser comprises a continuous groove (shown as 22a, 122a, 222a, 322a) extending along a respective first surface 22c, 122c, 222c, 322c of the corresponding one of rupturable portions 22, 122, 222, 322. However, the stress riser may reside in an interior portion of the rupturable portion, rather than on an outer surface of the part. In another embodiment (not shown), rather than a single stress riser, a plurality of stress risers are formed on or in the rupturable portion.

Referring again to FIGS. 1A, 1B, 5, and 6, in one embodiment, member 22 is a disk stamped, molded, or otherwise formed from a metallic, polymeric, or other material into which stress riser 22a may be formed and which possesses the strength necessary to resist the forces exerted on the member by the compressed gas stored in bottle 18. The materials and structural details of the member will depend on such factors as the pressure of the gas sealed in bottle 12 and the desired performance characteristics of an inflator 8 or gas generating system into which mechanism 10 is incorporated. For example, members made from materials and/or having structures which are more or less readily ruptured may be used.

A rigid, cantilevered member or extension 23 is coupled to the rupturable portion using any suitable method. In the embodiment shown in FIGS. 1A-1B, extension 23 is coupled to rupturable portion 22 using any suitable method. Extension 23 is shown attached to a surface 22d of rupturable portion 22 opposite surface 22c. In the embodiment shown in FIGS. 1A-1B, the extension has a maximum cross-sectional dimension "D" (viewed looking into the page in FIG. 1A) generally coincident with a perimeter defined by the "deepest" portion 22b of groove 22a, which defines the region of minimum material thickness along the rupturable portion 22. This helps to ensure optimum transfer of force from the extension to the stress riser, which aids in ensuring that a predetermined minimum force acting on the extension produces a rupture of the rupturable portion. This, in turn, permits pressurized inflation fluid flow past the gas seal.

As seen in the embodiments shown in FIGS. 1A-4B, the extension can be solid or tubular or otherwise hollow. The extension can be formed from a metallic material, a polymeric material, or any other material having rigidity suitable for the purposes described herein. The extension can have any desired shape and may be attached to the rupturable portion so as to extend from the rupturable portion at any desired angle with respect to the rupturable portion surface. In a particular embodiment (shown in FIGS. 1A and 1B), the extension is cylindrical and is extends perpendicular to a surface of the rupturable portion. The extension may be attached to the rupturable portion by any of a variety of known methods, such as welding or adhesives. As seen in FIGS. 5 and 6, rupturable portion 22 is attached and sealed to the gas bottle or housing such that extension 23 resides exterior of the gas bottle 18

Figures 2A, 2B:
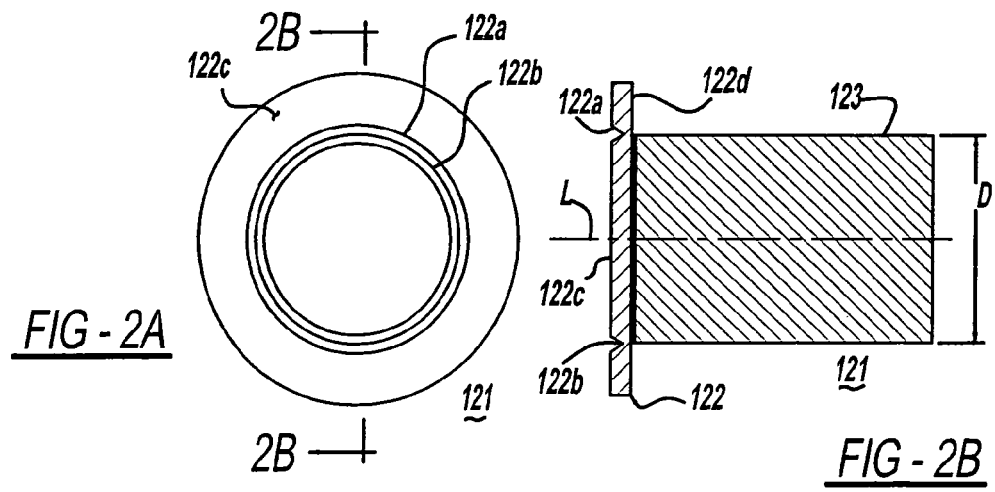
FIG. 2A is an end view of a gas seal for sealing a gas-storage bottle in accordance with a second embodiment of the present invention.
FIG. 2B is a cross-sectional view of the gas seal shown in FIG. 2A.
Figures 3A, 3B:
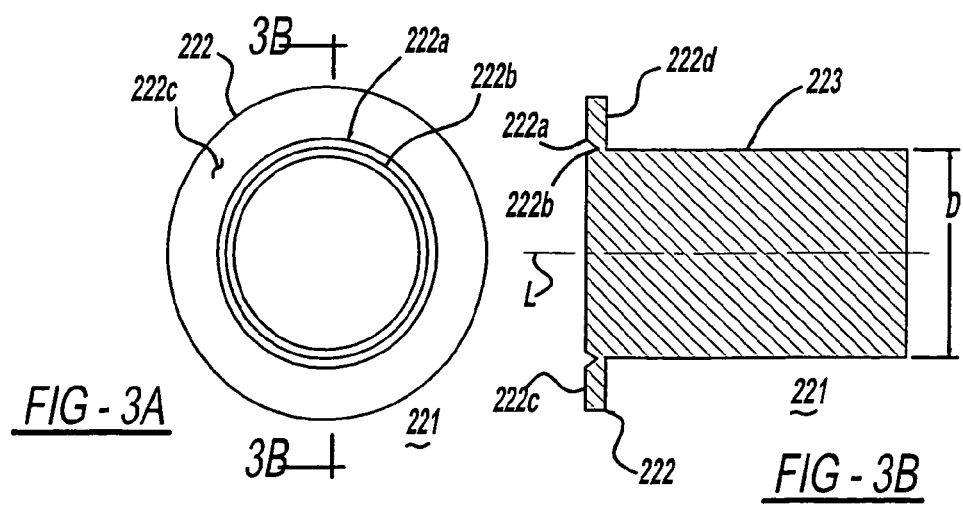
FIG. 3A is an end view of a gas seal for sealing a gas-storage bottle in accordance with a third embodiment of the present invention.
FIG. 3B is a cross-sectional view of the gas seal shown in FIG. 3A.

FIGS. 2A and 2B show a gas seal in accordance with another embodiment of the present invention, similar to the embodiment shown in FIGS. 1A-1B. In FIGS. 2A and 2B, extension 123 is a solid structure attached to rupturable portion 123.

In another embodiment (seen in FIGS. 3A-3B), the gas seal comprises a rupturable portion 222 having an extension 223 formed integrally therewith. As in the previously described embodiments rupturable portion 222 has a stress riser 222a coined, embossed, or otherwise formed on one or both sides thereof. Extension 223 is formed from a solid slug of steel or other suitable material. Typical methods of manufacture of the slug include forging, cold heading and impacting, although other alternative methods may be used. A configuration designed to reduce the mass of the extension is shown in FIGS. 4A & 4B, wherein the extension 323 is hollow.

Although the embodiments shown in FIGS. 6-8 include the embodiment of the gas seal shown in FIGS. 1A-1B for purposes of the following explanation, it will be understood that any of the gas seal embodiments shown in FIGS. 2A-4B may alternatively be used in the mechanism. Referring to FIG. 6, a device capable of supplying a predetermined minimum force on demand to the extension 23 is mounted or coupled to mechanism 10 so as to permit fluid communication between the device and the extension upon activation of the inflator or gas generating system. Suitable force-generating devices include explosively actuated projectiles or pin pokers (which directly contact the extension when activated), and any devices capable of supplying a gas jet or shock front, for example initiators, gas generators and detonators. In the embodiment shown in FIGS. 6-8, a known initiator 66 is crimped or otherwise suitably secured to a periphery of housing 12 and extends through a wall of the housing so that, upon activation of the initiator 66, fluid communication between extension 23 and the initiator is enabled. One exemplary initiator construction is described in U.S. Pat. No. 6,009,809, herein incorporated by reference.

In addition, it may be seen from FIG. 6 that rupturable portion 22 and extension 23 lay along a common axis L extending between a first end 14 of housing 12 and a second end 16 of housing 12. It may also be seen that initiator 66 is spaced apart from axis L. Stated another way, initiator 66 does not intersect axis L along which member 22 and extension 23 are positioned. As used herein, the term "axis" is understood to designate a line in relation to which parts of a structure or body may be referenced. It may also be seen that initiator 66 is positioned so as to directly apply a lateral load (i.e., a load or force acting laterally or transversely to axis L) to extension 23. However, the force may alternatively be applied indirectly, depending on the requirements of a particular application.

Referring to FIGS. 6-8, a hollow diffuser 44 is machined or otherwise formed from steel or other suitable materials, and then welded or otherwise fixed to housing second end 16. Diffuser 44 may alternatively be formed integral with housing 12. Diffuser 44 functions to distribute gas flowing through and received from housing 12. A plurality of gas discharge orifices 54 is spaced about a circumference of the diffuser. The embodiment shown in FIGS. 6-8 includes four gas discharge orifices 54 evenly spaced about the circumference of the diffuser. The diffuser may incorporate a filter (not shown) therein to filter combustion products or other debris from the inflation fluid prior to gas distribution. Any suitable metallic mesh filter, woven wire cloth, or other type of filter may be used, many examples of which are known and obtainable from commercially available sources (for example, Wayne Wire Cloth Products, Inc. of Bloomfield Hills, Mich.)

Operation of the mechanism will now be discussed with reference to FIGS. 6-8. Upon occurrence of a crash event, the igniter 66 is activated by a signal received from a crash sensor or accelerometer (not shown). Pressure generated by activation of the initiator acts on extension 23 applying a predetermined minimum force to the extension.

With the stored pressurized fluid acting on rupturable portion 22, the rupturable portion is stressed. This applied stress is less than the break strength of the rupturable portion along stress riser 22a. When the predetermined minimum force is applied to the extension attached to the rupturable portion, a corresponding reaction stress is applied at the junction between the rupturable portion and the extension. This stress induces an additional tensile stress in the rupturable portion. This additional tensile stress, combined with the stress on the rupturable portion due to the pressure from gases stored in the bottle, exceeds the break strength of the rupturable portion along the stress riser. The rupturable portion fractures along the stress riser, and the fracture propagates along the stress riser. The center portion of the rupturable portion breaks free, with the extension attached, and is pushed away from the gas bottle by the contained gas pressure.

Stored pressurized fluid within bottle 18 then flows through rupturable portion 22 and through housing 12, into diffuser 44, and out of the diffuser through orifices 54 and into an airbag or other inflatable element (not shown). A filter (not shown) positioned in diffuser 44 traps by-products of initiator activation, portions of the member, or other debris within the diffuser to prevent their entry into the airbag.

The thickness of the rupturable portion along the stress riser affects the pressure at which the rupturable portion will burst. The burst strength of the rupturable portion is greater than the stress induced by the compressed gas alone, but less than the combined stress resulting from the compressed gas and the stresses due to the force moment resulting from side loading of the cantilevered extension. The burst strength of the member is also less than the pressure needed to rupture the bottle internally. This provides a safe gas relief mechanism for over-pressurization situations caused by, for example, a fire external to the gas bottle.

FIGS. 9-14 show various alternative embodiments of mechanism 110 for releasably containing pressurized fluid in a container, in accordance with the present invention.

Referring to FIGS. 10-14, mechanism 110 is shown secured to a gas bottle or tank 18 in which a pressurized fluid (in this case, an inflation gas) is stored. Bottle 18 has an annular wall 36 defining an opening, with an annular shoulder 37 extending from annular wall 36 and an annular ledge 26 extending along a base portion of shoulder 37.

Referring to FIGS. 9-14, mechanism 110 includes a gas seal 421 comprising a rupturable portion 422 secured in fluid communication with an interior of bottle 18. Rupturable portion 422 forms a fluid-tight barrier preventing flow of pressurized gas through or around the rupturable portion. Rupturable portion 422 may be seated along gas bottle annular ledge 26 and welded or otherwise secured thereon to obstruct flow of the pressurized fluid during normal vehicular operation. Alternatively, as shown in FIGS. 10-14, the rupturable portion may be seated along an edge of a housing 12 which is attached to an opening of bottle 18.

In the embodiments shown in FIGS. 9-14, rupturable portion 422 comprises an upper portion 422m of a drawn cup including a flange 422a. An extension 422n is coupled to upper portion 422m so as to enable breakage of the connection between the upper portion and extension upon application of a predetermined minimum force to a portion of the gas seal. Also, a projection extends from the extension 422n against which the predetermined minimum force acts to produce rupture of the rupturable portion. In the embodiments shown in FIGS. 9-14A, the projection is in the form of a seal portion 423 welded or otherwise attached to the closed end of the cup. Gas seal 421 includes relatively thicker wall sections 422c and 422d, and at least one relatively thinner wall section 422e interposed between thicker wall sections 422c and 422d. As wall section 422e is relatively thinner, this section is less resistant to stresses applied to rupturable portion 422. Thus, the gas seal will tend to break along this relatively thinner wall section before breaking along other portions of the seal. Therefore, this thinner wall section 422e defines a circumferential break region along which the rupturable portion 422 fractures to release the pressurized fluid from the bottle when the rupturable portion is stressed as described below.

Figure 11:
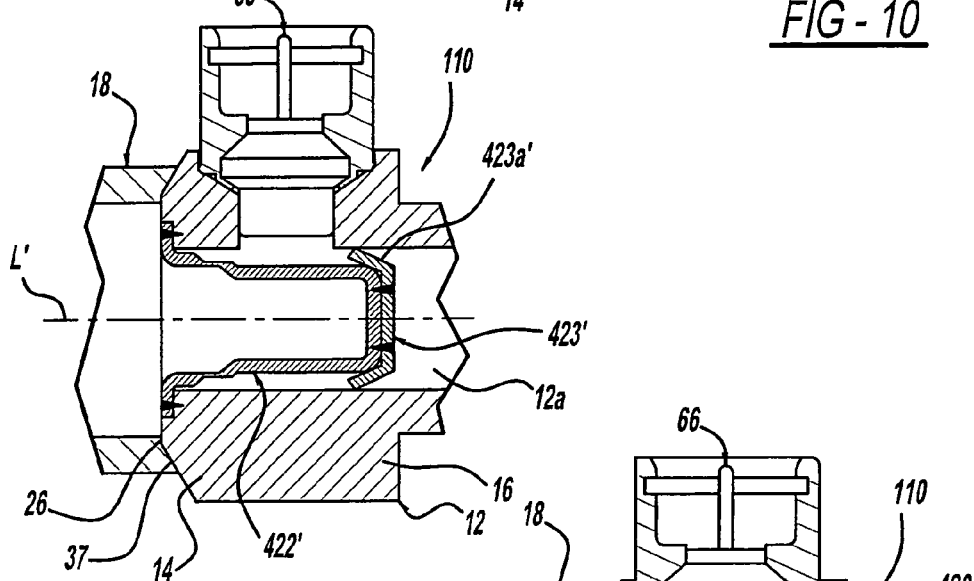
FIG. 11 is a partial cross-sectional view of a gas seal in accordance with another embodiment of the present invention incorporated into a housing attached to a gas bottle.
Figure 12:
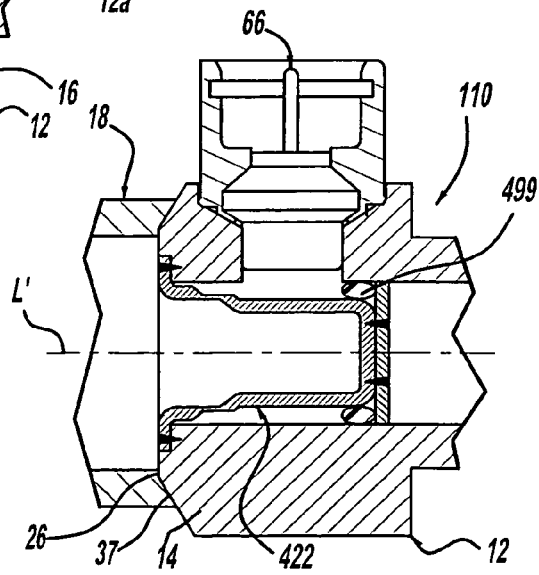
FIG. 12 is a partial cross-sectional view of a gas seal in accordance with another embodiment of the present invention incorporated into a housing attached to a gas bottle.

The thickness of thinner wall section 422e controls the burst strength of the cup. The thinned section thickness is specified such that the breaking strength of the cup along the break region is greater than the stress induced in the cup wall by the gas pressure contained in the bottle. The seal portion 423 attached to the cup 422 acts as a gas seal between the housing bore and the cup. As seen in FIG. 11, various alternative seal portion configurations may be employed to improve the gas seal and reduce the impact of component tolerances on the gas seal. For example, in the embodiment shown in FIG. 11, flaps 423a' resiliently deflect toward axis L' when seal portion 423' is inserted into housing passage 12a, thereby forming a seal between the seal portion and a wall of passage 12a. In addition, a separate seal (such as an O-ring 499) (FIG. 12) may be included to improve the gas seal.

The materials and structural details of the rupturable portion will depend on such factors as the pressure of the gas sealed in bottle 12 and the desired performance characteristics of an inflator 8 or gas generating system (see FIG. 10) into which mechanism 110 is incorporated. For example, members made from materials and/or having structures which are more or less readily ruptured may be used.

A device capable of generating a predetermined minimum force within housing 12 is mounted so as to permit fluid communication with the cup upon activation of the inflator or gas generating system. Suitable force-generating devices include explosively actuated projectiles or pin pokers, and any devices capable of supplying a gas jet or shock front, for example initiators, gas generators and detonators. In the embodiments shown in FIGS. 10-14, a known initiator 66 is crimped or otherwise suitably secured to a periphery of housing 12 and extends through a wall of the housing so that, upon activation of the initiator 66, fluid communication between gas seal 21 and the initiator is enabled. One exemplary initiator construction is described in U.S. Pat. No. 6,009,809, herein incorporated by reference.

Figure 10:
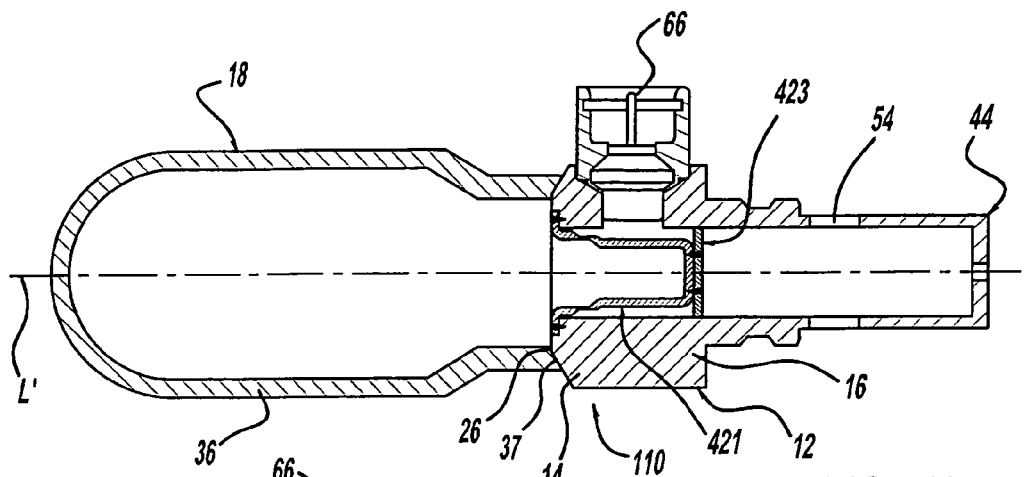
FIG. 10 is a cross-sectional view of the gas seal shown in FIG. 9 incorporated into a housing attached to a gas bottle.

In addition, it may be seen from FIGS. 9 and 10 that cup 422 and seal portion 423 lay along a common axis L' extending between a first end 14 of housing 12 and a second end 16 of housing 12. It may also be seen that initiator 66 is spaced apart from axis L'. Stated another way, initiator 66 does not intersect axis L' along which cup 422 and disk 423 are positioned.

Referring to FIGS. 10 and 14, a hollow diffuser 44 (as seen in the embodiments disclosed in FIGS. 1-8) is machined or otherwise formed from steel or other suitable materials, and then welded or otherwise fixed to housing second end 16.

Operation of the embodiments shown in FIGS. 10-16 is as follows. Referring to FIGS. 13 and 14, upon occurrence of a crash event, the igniter 66 is activated by a signal received from a crash sensor or accelerometer (not shown). When the igniter is fired, a cavity bounded by the cup flange 422a, the seal portion 423, the cup walls 422c, 422d, and 422e and the housing bore is pressurized. Pressure generated by activation of the initiator acts on cup 422 and seal portion 423, applying a load on seal portion 423 in the direction of arrow A (substantially parallel with axis L') (FIG. 13). This force induces an axial tensile load in the cup wall. The combination of the stress induced by the bottle gas pressure and the stress induced by the load on the seal portion exceeds the break strength of the relatively thinner portion 422e of the cup wall. The cup fractures along the thinner wall section 422e. The end of the cup and attached disk 423 are pushed down the housing bore by the gas pressure in the bottle, thereby releasing the gas from the bottle.

Stored pressurized fluid within bottle 18 then flows through rupturable portion 22 and through housing 12, into diffuser 44, and out of the diffuser through orifices 54 and into an airbag or other inflatable element (not shown). A filter (not shown) positioned in diffuser 44 traps by-products of initiator activation, portions of the member, or other debris within the diffuser to prevent their entry into the airbag.

The wall thickness of the thin-walled portion 422e of the cup affects the pressure at which the rupturable member will burst. The burst strength of the rupturable portion is greater than the stress induced by the compressed gas in the bottle, but less than the combined stress produced by the compressed gas and the forces on the cup resulting from activation of the igniter. The breaking strength of the rupturable portion is also less than the pressure inside the bottle needed to rupture the bottle. This provides a safe gas relief mechanism for over-pressurization situations caused by, for example, a fire external to the gas bottle.

FIGS. 15A-23 show other various embodiments of a mechanism 210 for releasably containing pressurized fluid in a container, in accordance with the present invention. Referring in particular to FIGS. 15A-16 and 20, in one embodiment, mechanism 210 includes a gas seal 521 comprising a rupturable portion 522 secured in fluid communication with an interior of a bottle 18 as previously described. Rupturable portion 522 forms a fluid-tight barrier preventing flow of pressurized gas through or around the member. Rupturable portion 522 may be seated along gas bottle annular ledge 26 and welded or otherwise secured thereon to obstruct flow of the pressurized fluid during normal vehicular operation. Alternatively, as shown in FIGS. 19-22, the member may be seated along an edge of a housing 12 which is attached to an opening of bottle 18. Rupturable portion 522 also has a stress riser 522a coined, embossed, or otherwise formed along one or both sides thereof. Stress riser 522a defines a region along which the rupturable portion fractures to release the pressurized fluid from the bottle, when the rupturable portion is stressed as described below.

In the embodiments shown in FIGS. 15A-18, the stress riser comprises a continuous groove (shown as 522a, 622a, 722a) extending along a respective first surface 522c, 622c, 722c of corresponding ones of rupturable portions 522, 622, 722. However, the stress riser may reside in an interior portion of the rupturable portion, rather than on an outer surface of the part. In another embodiment (not shown), rather than a single stress riser, a plurality of stress risers are formed in the rupturable portion.

In the embodiment shown in FIGS. 15A-15B, the rupturable portion 522 is a disk stamped, molded, or otherwise formed from a metallic, polymeric, or other material into which stress riser 522a may be formed and which possesses the strength necessary to resist the forces exerted on the member by the compressed gas stored in bottle 18. Rupturable portions 622 and 722 have structures similar to rupturable portion 522. The materials and structural details of the member will depend on such factors as the pressure of the gas sealed in bottle 12 and the desired performance characteristics of an inflator 8 (see FIG. 19) or gas generating system into which mechanism 210 is incorporated. For example, members made from materials and/or having structures which are more or less readily ruptured may be used.

In the embodiments shown in FIGS. 16-18, each of gas seals 521, 621, and 721 also includes respective a extension 523, 623, 723 coupled to their respective rupturable portions using any suitable method. The extensions 523, 623, 723 can be solid or tubular or otherwise hollow. The extensions 523, 623, 723 can be formed from a metallic material, a polymeric material, or any other material having rigidity suitable for the purposes described herein. The extensions can have any desired shape and may be attached to their respective rupturable portions so as to extend from the rupturable portion at any desired angle with respect to the rupturable portion surface. In particular embodiments (shown in FIGS. 15A-22), the extension is cylindrical and is extends perpendicular to a surface of the respective rupturable portion. The extensions are attached to the respective rupturable portions using any of a variety of known methods, such as welding or adhesives. As seen in FIGS. 19-21, rupturable portion 522 (and also the other rupturable portions 622, 722) is attached and sealed to the gas bottle or housing such that extension 523 resides exterior of the bottle. As seen in the embodiments shown in FIGS. 16-18, the extensions also have corresponding flanges 523a, 623a, and 723a, 823a formed or attached to ends of the extensions. The flange attached to the extension acts as a gas seal between the housing bore and the extension. As seen in FIGS. 16-18 and 20-21, various alternative flange configurations may be employed to improve the gas seal and reduce the impact of component tolerances on the gas seal. In addition, separate seal (such as an O-ring 100) (FIG. 20) may be included to improve the gas seal. In another embodiment (seen in FIG. 17), extension 623 is formed from a solid slug of steel or other suitable material. Typical methods of manufacture of the slug include forging, cold heading and impacting, although other alternative methods may be used.

Referring to FIGS. 19-22, a device (for example, an initiator 66) capable of generating a pressure surge within housing 12 is positioned along the length of the extension so as to permit fluid communication with the extension upon activation of the inflator, as previously described.

Referring to FIG. 19, a hollow diffuser 44 is machined or otherwise formed from steel or other suitable materials, and then welded or otherwise fixed to housing second end 16 as previously described.

The stress risers 522a, 622a, 722a, 822a on respective rupturable portions 522, 622, 722, 822 provide circumferential break regions. The thickness of the rupturable portions along these stress risers controls the breaking strengths of the members. This thicknesses are such that the burst strengths of the members are greater than the stresses induced by the gas pressure contained in the bottle.

Figure 23:
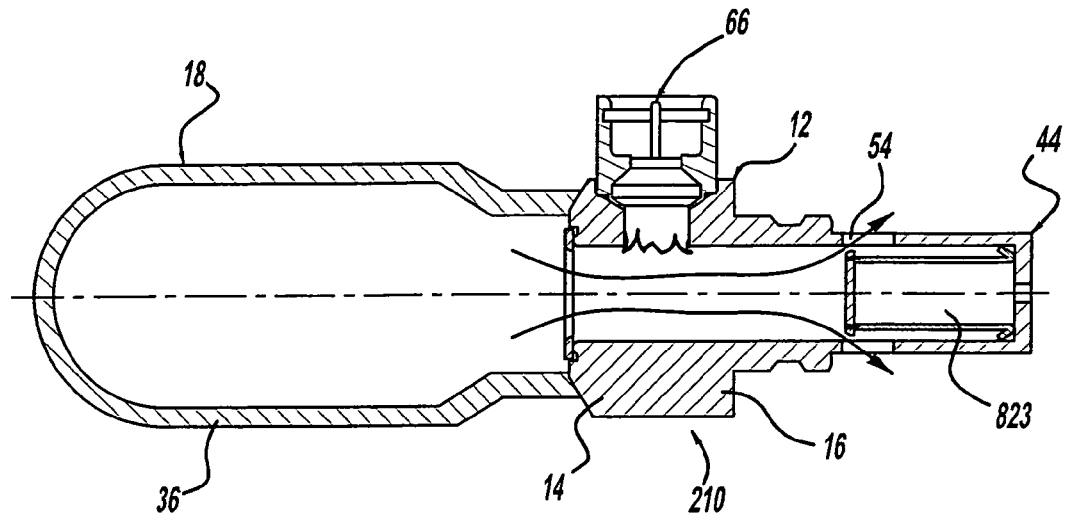
FIG. 23 is the partial cross-sectional view of FIG. 22 after breakage of the gas seal.

FIGS. 22 and 23 show operation of mechanism 210 incorporating the embodiment of the gas seal shown in FIG. 21. Referring to FIGS. 22 and 23, upon occurrence of a crash event, the igniter 66 is activated by a signal received from a crash sensor or accelerometer (not shown). When the igniter is fired, a cavity 101 bounded by the extension flange 823a, the rupturable portion 822, the extension 823 and the housing bore is pressurized. Pressure generated by activation of the initiator acts on extension flange 823a, applying a load on the flange in the direction of arrow "A" (substantially parallel with axis L") (see FIG. 22). This force induces an axial tensile load in member rupturable portion 822.

The combination of the stress induced by the bottle gas pressure and the stress induced by the axial load on the flange exceeds the break strength of rupturable portion 822. The rupturable portion fractures along the stress riser. The center portion of the rupturable portion, along with the extension and flange, is pushed down the housing bore by the gas pressure in the bottle, thereby releasing the gas from the bottle.

Pressurized fluid within bottle 18 then flows through rupturable portion 822 and through housing 12, into diffuser 44, and out of the diffuser through orifices 54 and into an airbag or other inflatable element (not shown). A filter (not shown) positioned in diffuser 44 traps by-products of initiator activation, portions of the member, or other debris within the diffuser to prevent their entry into the airbag.

The burst strength of the rupturable portion 822 is greater than the stress induced by the compressed gas in the bottle, but less than the combined stress resulting from the compressed gas and the forces on the extension flange produced by activation of the igniter. The burst strength of the rupturable portion is also less than the pressure inside the bottle needed to rupture the bottle. This provides a safe gas relief mechanism for over-pressurization situations caused by, for example, a fire external to the gas bottle.

Figure 24:
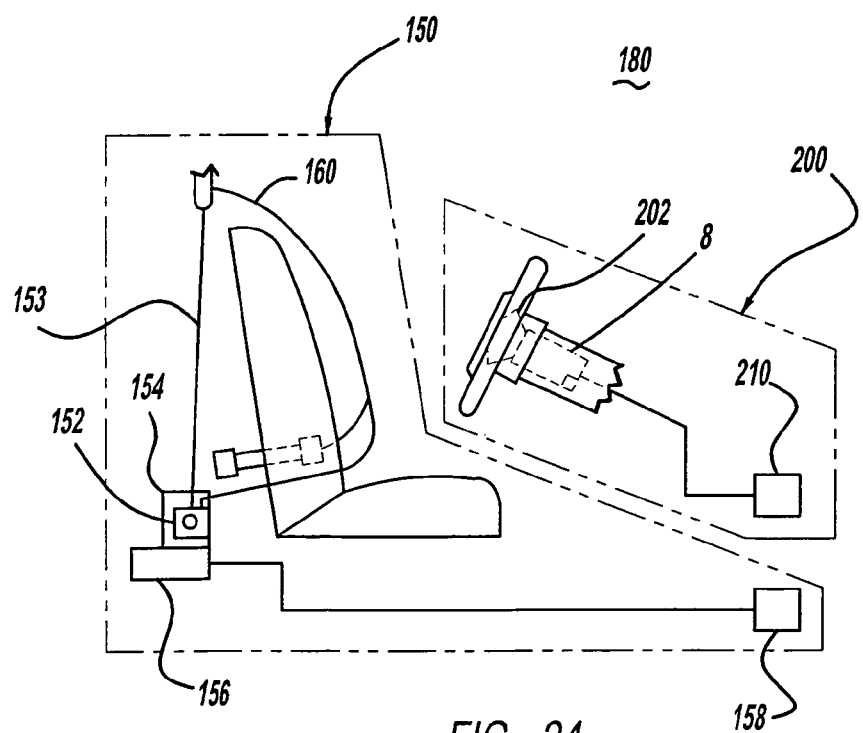
FIG. 24 is a schematic view of an airbag system and a vehicle occupant protection system incorporating an inflator including a gas seal in accordance with an embodiment of the present invention.

Referring to FIG. 24, an inflator or gas generating system 8 including an embodiment of the gas seal described herein may be incorporated into an airbag system 200. Airbag system 200 includes at least one airbag 202 and an inflator 8 coupled to airbag 202 so as to enable fluid communication with an interior of the airbag. Airbag system 200 may also incorporate (or be in communication with) a crash event sensor 210 including a known crash sensor algorithm that signals actuation of airbag system 200 via, for example, activation of igniter 66 in the event of a collision.

Referring again to FIG. 24, an embodiment of the inflator or an airbag system including an embodiment of the inflator may be incorporated into a broader, more comprehensive vehicle occupant restraint system 180 including additional elements such as a safety belt assembly 150, as seen in FIG. 24. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558, 832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may incorporate (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas seal for containing a pressurized fluid in a container, the gas seal comprising:
    a rupturable portion; and
    an extension coupled to the rupturable portion such that at least a portion of a force acting on the extension is transferred to the rupturable portion so as to promote rupture of the rupturable portion by generating stresses in the rupturable portion, the extension defining a cavity therein, the cavity having at least one closed end, wherein the rupturable portion closes a closed end of the cavity.

2. The gas seal of claim 1 wherein at least one stress riser is formed along a first surface thereof.

3. The gas seal of claim 2 wherein the extension is coupled to the rupturable portion along a second surface of the rupturable portion.

4. A mechanism for releasably containing pressurized fluid in a container, the mechanism comprising:
    a housing coupled to the container;
    a gas seal in accordance with claim 1 mounted in the housing in fluid communication with the pressurized fluid; and
    a mechanism for generating a predetermined minimum force for acting on the extension to produce a rupture of the gas seal.

5. The mechanism of claim 4 wherein the housing defines a flow direction of pressurized fluid through the housing, and wherein the predetermined minimum force acts on the extension in a direction substantially parallel to the flow direction to produce a rupture of the gas seal.

6. An inflator including a gas seal in accordance with claim 1.

7. A gas generating system including a gas seal in accordance with claim 1.

8. A vehicle occupant protection system including a gas seal in accordance with claim 1.

9. A gas generating system comprising:
    a housing;
    a first seal including a rupturable portion coupled to the housing to form a gas seal therewbetween;
    an extension coupled to the rupturable portion such that a predetermined minimum force acting on the extension produces a rupture of the rupturable portion; and
    a second seal positioned along the extension and engaging an element of the gas generating system so as to form a second gas seal therebetween.

10. The gas generating system of claim 9 wherein the element of the gas generating system engaging the second seal is the housing.

11. The gas generating system of claim 9 wherein the second seal comprises a flange positioned at an end of the extension.

12. The gas generating system of claim 9 wherein the second seal comprises a resilient gasket.

13. An inflator including a gas seal in accordance with claim 9.

14. A gas generating system including a gas seal in accordance with claim 9.

15. A vehicle occupant protection system including a gas seal in accordance with claim 9.

16. The gas generating system of claim 9 wherein the rupturable portion is directly attached to the housing, and wherein at least one stress riser is formed along a first surface of the rupturable portion.

17. A gas seal for containing a pressurized fluid in a container, the gas seal comprising:
   a rupturable portion;
   an extension coupled to the rupturable portion such that a predetermined minimum force acting on the extension produces a rupture of the rupturable portion, permitting pressurized fluid flow past the gas seal; and
   a projection positioned at a closed end of the extension and against which the predetermined minimum force acts to produce rupture of the rupturable portion.

18. The gas seal of claim 17 wherein the projection engages a wall of a housing in which the gas seal is mounted to form a gas seal between the extension and the housing.

19. The gas seal of claim 17 wherein the projection comprises a seal portion attached to an end portion of the extension.

20. The gas seal of claim 17 wherein the projection comprises a flange extending from the extension.

21. A mechanism for releasably containing pressurized fluid in a container, the mechanism comprising:
   a housing coupled to the container;
   a gas seal for containing a pressurized fluid in a container, the gas seal comprising:
   a rupturable portion; and
   an extension coupled to the rupturable portion such that at least a portion of a force acting on the extension is transferred to the rupturable portion so as to promote rupture of the rupturable portion by generating stresses in the rupturable portion, the extension defining a cavity therein, the cavity having at least one closed end, wherein the rupturable portion closes a closed end of the cavity,
   the gas seal being mounted in the housing in fluid communication with the pressurized fluid; and
   a mechanism for generating a predetermined minimum force for acting on the extension to produce a rupture of the gas seal,
   wherein the housing defines a flow direction of pressurized fluid through the housing, and wherein the predetermined minimum force acts on the extension in a direction transverse to the flow direction to produce a rupture of the gas seal.

22. A gas seal for containing a pressurized fluid in a container, the gas seal comprising:
   a rupturable portion positioned at a first end of the gas seal for forming a first seal between the rupturable portion and a housing in which the gas seal is mounted; and
   an extension coupled to the rupturable portion, the extension including a projection extending therefrom for forming a second seal between the extension and the housing.

23. An inflator including a gas seal in accordance with claim 22.

24. A gas generating system including a gas seal in accordance with claim 22.

25. A vehicle occupant protection system including a gas seal in accordance with claim 22.

* * * * *

UNITED STATES PATENT AND TRADEMARK OFFICE
CERTIFICATE OF CORRECTION

PATENT NO.         : 8,113,542 B1                                    Page 1 of 1
APPLICATION NO.    : 12/321537
DATED              : February 14, 2012
INVENTOR(S)        : Stevens et al.

It is certified that error appears in the above-identified patent and that said Letters Patent is hereby corrected as shown below:

Col. 4, Line 11;            Insert -- . -- after the 18

Col. 8, Line 3;             Delete "rat her" and insert -- rather --

Col. 10, Line 61, Claim 9;  Delete "therewbetween" and insert -- therebetween --

Signed and Sealed this
Nineteenth Day of June, 2012

David J. Kappos
*Director of the United States Patent and Trademark Office*